US010186804B2

(12) United States Patent
Menolotto et al.

(10) Patent No.: US 10,186,804 B2
(45) Date of Patent: Jan. 22, 2019

(54) CABLE CONNECTOR WITH BACKSHELL LOCKING

(71) Applicant: Amphenol Corporation, Wallingford, CT (US)

(72) Inventors: Paolo Menolotto, Mount Martha (AU); Thien H. Nguyen, Springvale (AU)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 15/628,167

(22) Filed: Jun. 20, 2017

(65) Prior Publication Data

US 2018/0366873 A1  Dec. 20, 2018

(51) Int. Cl.
*H01R 13/622* (2006.01)
*H01R 13/627* (2006.01)
(Continued)

(52) U.S. Cl.
CPC ....... *H01R 13/6277* (2013.01); *H01R 13/641* (2013.01); *F16F 1/368* (2013.01);
(Continued)

(58) Field of Classification Search
CPC .... H01R 13/622; H01R 13/639; H01R 4/301; H01R 13/533; H01R 33/975;
(Continued)

(56) References Cited

U.S. PATENT DOCUMENTS 2,306,821 A   12/1942  Markey
2,331,409 A   10/1943  Markey
(Continued)

FOREIGN PATENT DOCUMENTS

DE    4123078 A1   1/1993
DE   10306252 A1   8/2004
(Continued)

OTHER PUBLICATIONS

Neutrik Catalog, "Operating & Assembling Instructions—NAC3MX-W, powerCON TRUE1," 2 pages.

*Primary Examiner* — Abdullah Riyami
*Assistant Examiner* — Justin Kratt
(74) *Attorney, Agent, or Firm* — Blank Rome LLP

(57) ABSTRACT

A cable connector that includes a housing that receives a contact member and has opposite first and second ends, an inner sleeve having an insert section extending into the second end of the housing and a cable termination section for receiving a cable and that includes a locking portion, a backshell having a first end that couples to the second end of the housing and an opposite second end that surrounds the sleeve's cable termination section, and a locking member positioned between the sleeve's cable termination section and the second end of the backshell. The locking member has a locking element for cooperating with the sleeve's locking portion. The backshell is rotatable with respect to the housing in a tightening direction, and the locking element engages the locking portion of the inner sleeve such that rotation of the backshell in a loosening direction opposite the tightening direction is prevented.

20 Claims, 3 Drawing Sheets

(51) Int. Cl.
*H01R 13/641* (2006.01)
*F16F 1/368* (2006.01)
*H01R 13/52* (2006.01)
*H01R 13/639* (2006.01)
*H01R 33/975* (2006.01)
*H01R 13/533* (2006.01)
*H01R 4/30* (2006.01)
*H01R 13/514* (2006.01)
*H01R 9/24* (2006.01)
*H01R 13/59* (2006.01)
*H01R 4/2475* (2018.01)

(52) U.S. Cl.
CPC ............ *H01R 4/2475* (2013.01); *H01R 4/301* (2013.01); *H01R 9/2408* (2013.01); *H01R 13/514* (2013.01); *H01R 13/5202* (2013.01); *H01R 13/5205* (2013.01); *H01R 13/533* (2013.01); *H01R 13/59* (2013.01); *H01R 13/622* (2013.01); *H01R 13/639* (2013.01); *H01R 33/975* (2013.01)

(58) Field of Classification Search
CPC .. H01R 4/2475; H01R 13/514; H01R 9/2408; H01R 13/5202; H01R 13/5205; H01R 13/59
USPC ....... 439/382, 701, 712, 411, 321, 461, 462, 439/589, 307
See application file for complete search history.

(56) References Cited

U.S. PATENT DOCUMENTS

| | | | |
|---|---|---|---|
| 4,183,605 A | 1/1980 | Arneson | |
| 4,392,699 A | 7/1983 | Weingartner | |
| 4,978,317 A | 12/1990 | Pocrass | |
| 5,046,964 A * | 9/1991 | Welsh | H01R 13/52 439/271 |
| 5,613,873 A | 3/1997 | Bell, Jr. | |
| 5,653,605 A | 8/1997 | Woehl et al. | |
| 5,685,737 A | 11/1997 | Morin et al. | |
| 5,700,157 A | 12/1997 | Chung | |
| 5,704,802 A | 1/1998 | Loudermilk | |
| 5,957,730 A | 9/1999 | Wang | |
| 6,056,586 A | 5/2000 | Lin | |
| 6,086,400 A | 7/2000 | Fowler | |
| 6,095,869 A | 8/2000 | Wang | |
| 6,109,954 A | 8/2000 | Lin | |
| 6,142,822 A | 11/2000 | Wu | |
| 6,152,753 A | 11/2000 | Johnson et al. | |
| 6,174,194 B1 | 1/2001 | Bleicher et al. | |
| 6,217,371 B1 | 4/2001 | Wu | |
| 6,319,062 B1 | 11/2001 | Ma et al. | |
| 6,319,070 B1 | 11/2001 | Tan | |
| 6,354,884 B1 | 3/2002 | Yeh et al. | |
| 6,383,025 B1 | 5/2002 | Shi et al. | |
| 6,428,361 B1 | 8/2002 | Imschweiler et al. | |
| 6,435,911 B1 | 8/2002 | Payson et al. | |
| 6,454,595 B1 | 9/2002 | Espenshade | |
| 6,457,993 B1 | 10/2002 | Espenshade | |
| 6,464,533 B1 | 10/2002 | Ma et al. | |
| 6,478,611 B1 | 11/2002 | Hyland | |
| 6,544,076 B2 | 4/2003 | Pocrass | |
| 6,558,203 B2 | 5/2003 | Pocrass | |
| 6,561,842 B1 | 5/2003 | Watanabe et al. | |
| 6,568,965 B2 | 5/2003 | Pocrass | |
| 6,582,248 B2 | 6/2003 | Bachman | |
| 6,588,100 B2 | 7/2003 | Ma et al. | |
| 6,592,397 B2 | 7/2003 | Pocrass | |
| 6,595,805 B2 | 7/2003 | Pocrass | |
| 6,648,674 B1 | 11/2003 | Dobler | |
| 6,663,417 B1 | 12/2003 | Hung | |
| 6,702,618 B1 | 3/2004 | Hyland et al. | |
| 6,910,917 B2 | 6/2005 | Chen | |
| 6,913,481 B2 | 7/2005 | Marshall et al. | |
| D512,023 S | 11/2005 | Bachmann | |
| D512,378 S | 12/2005 | Dobler | |
| D512,965 S | 12/2005 | Dobler | |
| D514,069 S | 1/2006 | Bachmann | |
| 6,984,155 B1 | 1/2006 | Liu | |
| 7,018,242 B2 | 3/2006 | Brown et al. | |
| 7,033,227 B2 | 4/2006 | Karir | |
| D524,738 S | 7/2006 | Dobler | |
| 7,182,621 B2 | 2/2007 | Reichle | |
| 7,267,584 B1 | 9/2007 | Liu | |
| 7,309,260 B2 | 12/2007 | Brower et al. | |
| 7,442,078 B1 | 10/2008 | Hsu | |
| 7,481,667 B2 | 1/2009 | Cheng | |
| D587,202 S | 2/2009 | Dobler | |
| D587,204 S | 2/2009 | Bachmann | |
| 7,540,753 B2 | 6/2009 | Dobler | |
| 7,648,385 B2 | 1/2010 | Wu | |
| 7,753,719 B2 | 7/2010 | Cheng | |
| 7,828,569 B2 | 11/2010 | Aronson et al. | |
| 7,857,524 B2 | 12/2010 | Dobler | |
| 7,857,643 B2 | 12/2010 | Dobler | |
| 7,922,519 B1 | 4/2011 | Sun | |
| D644,179 S | 8/2011 | Dobler | |
| 8,002,577 B1 | 8/2011 | Sun | |
| 8,016,612 B2 | 9/2011 | Burris et al. | |
| 8,038,476 B2 | 10/2011 | Chen | |
| 8,057,252 B2 | 11/2011 | Sun | |
| 8,100,712 B2 | 1/2012 | Sun | |
| 8,152,564 B2 | 4/2012 | Chang | |
| 8,221,156 B2 | 7/2012 | Sun | |
| 8,241,056 B2 | 8/2012 | Sun | |
| D677,626 S | 3/2013 | Dobler | |
| D677,627 S | 3/2013 | Dobler | |
| D679,653 S | 4/2013 | Dobler | |
| 8,435,080 B2 | 5/2013 | Dobler et al. | |
| D692,829 S | 11/2013 | Dobler | |
| D693,304 S | 11/2013 | Dobler | |
| D734,267 S | 7/2015 | Dobler | |
| D737,771 S | 9/2015 | Hofmann | |
| D754,607 S | 4/2016 | Hofmann | |
| D755,720 S | 5/2016 | Dobler | |
| 9,401,565 B2 | 7/2016 | Dobler | |
| 9,450,328 B2 | 9/2016 | Lindkamp | |
| 9,559,457 B2 | 1/2017 | Strahl | |
| D778,838 S | 2/2017 | Dobler | |
| D779,434 S | 2/2017 | Dobler | |
| 2003/0036313 A1 | 2/2003 | Bollin et al. | |
| 2003/0148654 A1 | 8/2003 | Kan | |
| 2005/0064752 A1 | 3/2005 | Serino | |
| 2008/0254685 A1 | 10/2008 | Murr et al. | |
| 2008/0268699 A1 | 10/2008 | Zuo et al. | |
| 2010/0099290 A1 * | 4/2010 | Gastineau | H01R 13/622 439/321 |
| 2010/0323546 A1 | 12/2010 | Penumatcha et al. | |
| 2012/0115360 A1 | 5/2012 | Penumatcha et al. | |
| 2014/0273583 A1 | 9/2014 | Baldwin et al. | |
| 2015/0044898 A1 | 2/2015 | Dobler | |
| 2015/0155652 A1 | 6/2015 | Ender | |
| 2016/0221282 A1 | 8/2016 | Maikisch | |
| 2016/0274315 A1 | 9/2016 | Koch | |

FOREIGN PATENT DOCUMENTS

| | | |
|---|---|---|
| EP | 1503463 A1 | 2/2005 |
| EP | 1598685 A1 | 11/2005 |
| FR | 2563939 A1 | 11/1985 |

* cited by examiner

CABLE CONNECTOR WITH BACKSHELL LOCKING

FIELD OF THE INVENTION

The present invention relates to a cable connector with a locking system designed to prevent exposure to the wires of the cable.

BACKGROUND OF THE INVENTION

Conventional cable connectors, particular power connectors, present a risk of injury if the wires of the cable are inadvertently accessed or exposed. This may happen if the connector is in an extreme environment, such as a vibration environment, which often loosens and ultimately disassembles the components of the connector exposing the cable wire and other potentially live components. This may also happen if the nut of the connector is inadvertently loosened through normal connector use making the cable wires accessible. Adding additional components to a conventional cable connector to prevent this risk would significantly increases the size of the connector, making that connector incompatible with many equipment systems.

Therefore, a need exists for a cable connector that is configured to reduce the risk of injury due to exposure to hazardous live components and cable wires while maintaining a compact design of the connector.

SUMMARY OF THE INVENTION

Accordingly, the present invention may provide a cable connector that comprises a housing that has opposite first and second ends and receives a contact member, the first end being configured to interface with a mating connector; an inner sleeve that has an insert section that extends into the second end of the housing and a cable termination section for receiving a cable, and the cable termination section includes a locking portion; a backshell that has a first end that couples to the second end of the housing and an opposite second end that surrounds the cable termination section of the inner sleeve; and at least one locking member that is positioned between the cable termination section of the inner sleeve and the second end of the backshell. The locking member has a locking element for cooperating with the locking portion of the inner sleeve. The backshell is rotatable with respect to the housing in a tightening direction, and the locking element of the locking member engages the locking portion of the inner sleeve such that rotation of the backshell in a loosening direction opposite the tightening direction is prevented.

In certain embodiments, the locking portion of the inner sleeve includes one or more outwardly extending teeth extending from the cable termination section of the inner sleeve; the locking element may be at least one inwardly extending tooth configured for a ratchet engagement with the one or more outwardly extending teeth of the inner sleeve; and/or the at least one inwardly extending tooth and the one or more outwardly extending teeth may have cooperating tangential surfaces allowing rotation of the backshell in the tightening direction and cooperating radial surfaces preventing rotation of the backshell in the loosening direction.

In some embodiments, the locking member may include a release element that extends at least partially through the second end of the backshell such that at least part of the release element is accessible from outside of the backshell; the release element of the locking member extends through the backshell in a radial direction and the at least part of the release element is configured to engage a lifting tool to lift the locking member away from the backshell, thereby releasing the backshell; and/or the release element may include a slot that is sized to receive the lifting tool.

In other embodiments, the locking member may be a leaf spring where the locking element extends inwardly from an inner surface of the leaf spring, and the release element extends outwardly from an outer surface of the leaf spring; the leaf spring may include at least one arm coupled to the backshell; the cable termination section of the inner sleeve may include a strain relief portion; the strain relief portion may be at a distal end of the cable termination section of the inner sleeve; the strain relief portion may be adjacent to the locking portion on the cable termination section; and/or the strain relief portion may be one or more collet fingers configured to cooperate with a chamfered surface of the backshell to provide strain relief to the cable.

The present invention may also provide a cable connector that comprises a housing having opposite first and second ends and receives a contact member, the first end being configured to interface with a mating connector; a backshell having opposite first and second ends, the first end thereof being configured to couple to the second end of the housing by rotating the backshell in a tightening direction; an inner sleeve having an insert section and a cable termination section, the insert section extending into the second end of the housing, and the cable termination section being configured to receive a cable; means for locking the backshell onto the housing such that the backshell is prevented from rotating with respect to the housing in a loosening direction that is opposite the tightening direction; and means for providing strain relief to the cable received in the cable termination section of the inner sleeve. The means for locking the backshell and the means for providing strain relief operate independently of one another. Both the means for locking the backshell and the means for providing strain relief are located at the cable termination section of the inner sleeve.

In a preferred embodiment, the connector also includes a means for releasing the means for locking the backshell, thereby allowing the backshell to rotate with respect to the housing in a loosening direction. In one embodiment, the means for locking the inner sleeve may include a locking member disposed between the backshell and the inner sleeve wherein the locking member cooperates with a locking portion of the cable termination section of the inner sleeve. In another embodiment, the locking member may be a leaf spring that includes an inwardly extending locking element that engages the locking portion of the inner sleeve and an opposite outwardly extending release element that engages the backshell. The locking member may be formed of a resilient injection molded material.

In yet another embodiment, the locking portion of the inner sleeve may include one or more outwardly extending teeth extending from the cable termination section of the inner sleeve and the locking element is at least one inwardly extending tooth, the one or more outwardly extending teeth and the at least one inwardly extending tooth form a one-way ratchet engagement allowing the backshell to rotate in the tightening direction and preventing the backshell from rotating in the loosening direction. The release element may extend through the inner sleeve so as to accessible from outside of the inner sleeve by a lifting tool. In a certain embodiment, the means for providing strain relief may include a plurality of collet fingers at a distal end of the cable termination section of the inner sleeve that cooperate with a chamfered surface of the backshell for crimping onto the cable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing figures.

DETAILED DESCRIPTION OF THE INVENTION

Referring to FIGS. 1-8, the present invention generally relates to a cable connector 100, such as a power connector, that has locking at its back or cable end. By providing locking at the back of the connector 100, the connector's components and the cable will remain assembled, even when in a vibration environment. In addition, the locking of the present invention prevents a user from inadvertently gaining access to potentially hazardous internal live wires (of a cable attached to the connector) by accidentally twisting off a backshell 110 of the connector 100. That is, the locking of the present invention prevents access without a deliberate user action, preferably involving the use of a lifting tool, generally simultaneously and in combination with the backshell 110 being twisted in a loosening direction. The locking of the present invention also prevents the connector from malfunctioning when mated with another connector thus providing a more reliable connector. That is, the locking of the present invention prevents the backshell 110 from inadvertently disassembling, thereby ensuring the contact member of the connector remains inside of the connector. The locking of the cable connector also advantageously provides strain relief for the cable in addition to providing the backshell locking.

Also, by locating the locking of the present invention at the back of the connector 100 (rather than near the thread of a housing that engages with the backshell), connector sealing features (such as O-rings and grommets) can be easily included in the connector such that all seals are under compression to provide a long-life sealing performance for the connector. The present invention allows the seals to reside inside of the connector, thereby avoiding deterioration of the seals over time. An in the connector of the present invention, any resilient sealing materials are kept separate from any sharp elements to avoid tears or perforations in the sealing materials and elements.

Figure 1:
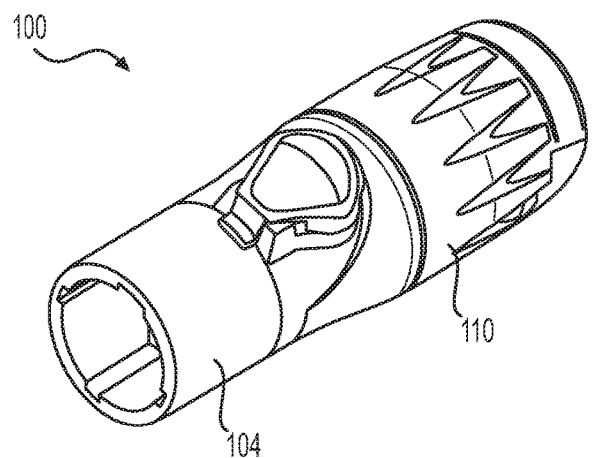
FIG. 1 is a front perspective view of a cable connector according to an exemplary embodiment of the present invention.
Figure 2:
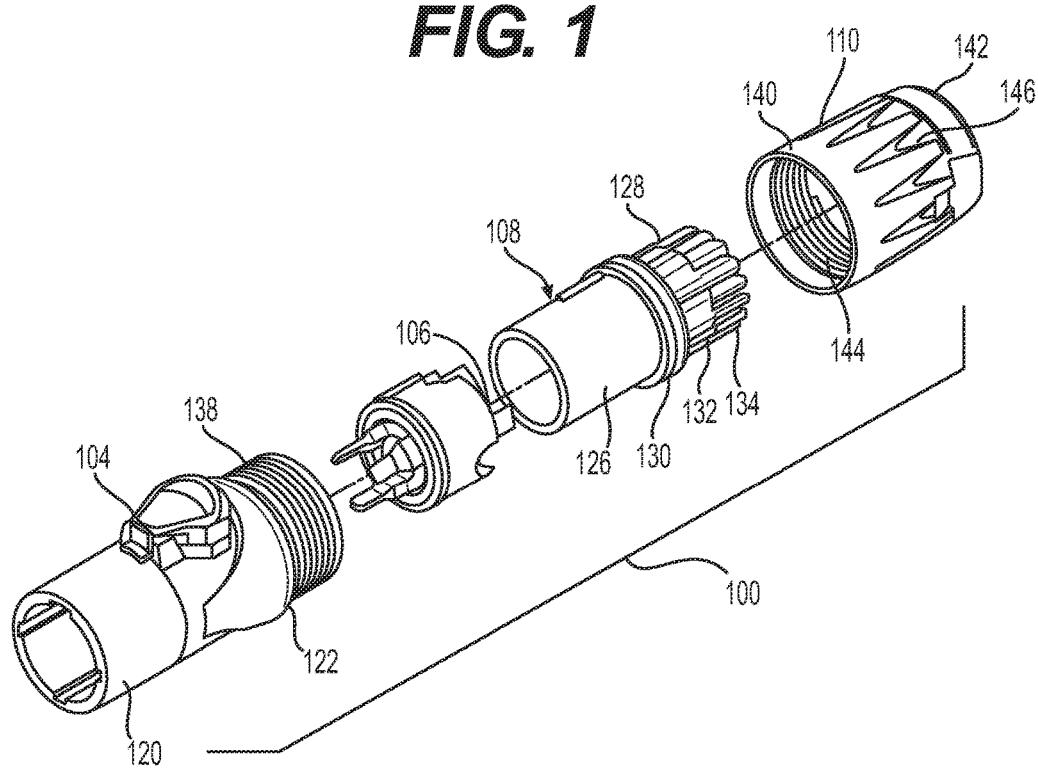
FIG. 2 is an exploded perspective view of the cable connector illustrated in FIG. 1.
Figure 3:
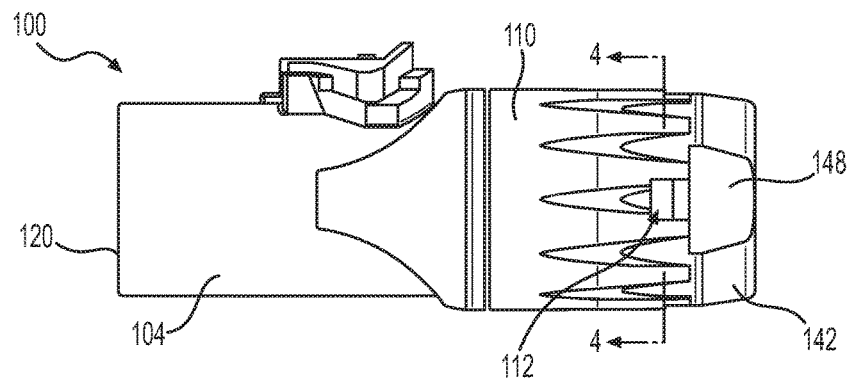
FIG. 3 is a side elevational view of the cable connector illustrated in FIG. 1.
Figure 4:
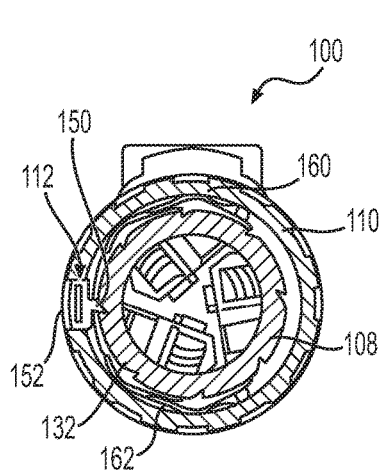
FIG. 4 is a cross-sectional view of the cable connector illustrated in FIG. 1, taken along line 4-4 of FIG. 3.

As seen in FIGS. 1 and 2, the cable connector 100 generally includes a housing 104, a contact member 106, an inner sleeve 108, the backshell 110, and a locking member 112 (FIG. 7) positioned between the inner sleeve 108 and the backshell 110. Housing 104 may have a generally cylindrical body with opposite first and second ends 120 and 122. First end 120 may be the front end of the housing 104 that is configured to interface with a mating connector. Second end 122 may be a back end of the housing 104 that couples to backshell 110. Housing 104 also supports the contact member 106. Contact member 106 may be a contact insert, for example, as is well known in the art.

Figure 8:
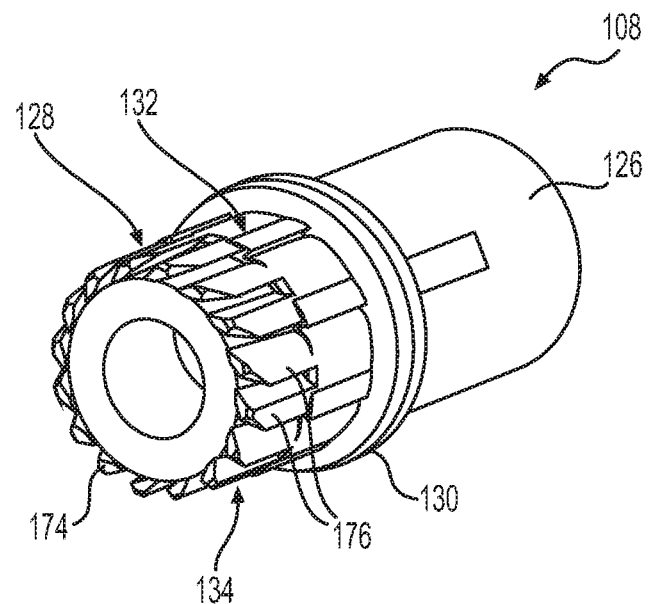
FIG. 8 is a perspective view of an inner sleeve of the cable connector illustrated in FIG. 1.

Inner sleeve 108 may have a substantially cylindrical body that has two sections including an insert section 126 and a cable termination section 128. An outwardly extending shoulder 130 may be provided between sections 126 and 128. Insert section 126 is inserted into the second end 122 of housing 104, such that the housing end abuts shoulder 130. Insert section 126 and the housing's second end 122 may include an alignment mechanism, such as cooperating alignment keys, to facilitate insertion and alignment of the insert section 126 with the housing's second end 122 and also to prevent rotation of inner sleeve 108 with respect to housing 104. Cable termination section 128 receives a prepared end of the cable where one or more conductors of the cable are electrically coupled to the contact member 106, as is known in the art. Cable termination section 128 includes both a locking portion 132 and a strain relief portion 134, as best seen in FIG. 8. Backshell 110 has opposite first and second ends 140 and 142. Backshell 110 may be, for example, a coupling nut. First end 140 couples to the second end 122 of housing 104. In a preferred embodiment, first end 140 of backshell 110 and second end 122 of housing 104 are coupled via a threaded engagement. That is, housing second end 122 may have outer threads 138 that engage inner threads 144 of backshell first end 140, as seen in FIG. 2. It should be appreciated that any known engagement may be used to couple the backshell 110 to the housing 104. The second end 142 of backshell 110 surrounds cable termination section 128 of inner sleeve 108.

The outer surface of backshell 110 preferably includes a gripping area 146 to facilitate gripping and rotation of backshell 110. The outer surface may include one or more flats to facilitate gripping of the backshell 110 using a standard tool, such as an open ring spanner. The second end 142 of backshell 110 may further include a pass through opening 146 (FIGS. 5 and 6) that is configured to receive part of locking member 112. A recessed area 148 may be provided on the outer surface of backshell 110 that is adjacent to pass through opening 146 to facilitate access to the part of locking member 112 received in pass through opening 146 from outside of backshell 110.

As seen in FIGS. 4-7, locking member 112 is located in a space between the locking portion 132 of the cable termination section 128 and the backshell 110 so that it is not under compression even when strain relief is applied to the strain relief portion 134 of the cable termination section 128 by the backshell 110. Locking member 112 generally includes a locking element 150 and a release element 152. Locking element 150 cooperates with locking portion 132 of the inner sleeve's cable termination section 128 to allow the backshell 110 to rotate in a tightening direction to tighten onto housing 104 and the cable received in inner sleeve 108, while also preventing the backshell 110 from rotating in the opposite loosening direction, thereby preventing inadvertent loosening of backshell 110 from the connector. Release element 152 cooperates with the second end 142 of backshell 110 to assist with releasing of locking element 150 to loosen backshell 110 if desired.

Figure 5:
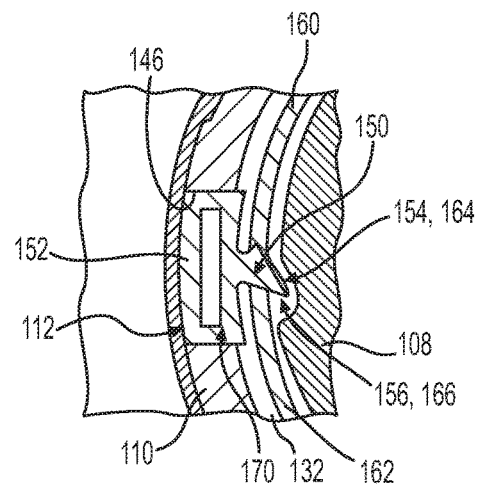
FIG. 5 is an enlarged partial view of the cross-section of the cable connector illustrated in FIG. 4.

In a preferred embodiment, the locking of the present invention provides a positive engagement one-way ratchet lock. For example, locking element 150 of locking member 112 may comprise at least one tooth that extends radially inwardly with respect to the longitudinal axis of connector 100 and locking portion 132 of inner sleeve 108 may comprises one or more teeth that extend radially outwardly with respect to the longitudinal axis of connector 100. The teeth of the inner sleeve's locking portion 132 may be spaced annularly on the cable termination section 128 of inner sleeve 108. The number of teeth of the locking portion 132 is preferably selected to optimize precision of the ratchet locking by providing smaller degrees of rotation. The tooth 150 of locking member 112 may engage the one or more outwardly extending teeth of the inner sleeve's locking portion 132 such that cooperating tangential surfaces 154 and 164 of each allows rotation of backshell 110 in the tightening direction and cooperating radial surfaces 156 and 166 of each prevent rotation of backshell 110 for rotating in the loosening direction, as best seen in FIG. 5.

In an alternative embodiment, the locking may work as a detent system. In this system the tooth 150 may have a more rounded tip and, while it can still have some bias, it does not positively engage against a loosening direction or a tightening direction. In this embodiment, the protruding release element may be eliminated and the locking would function based on the degree of frictional resistance, this being generally limited to the flexural properties of locking element 112.

Figure 6:
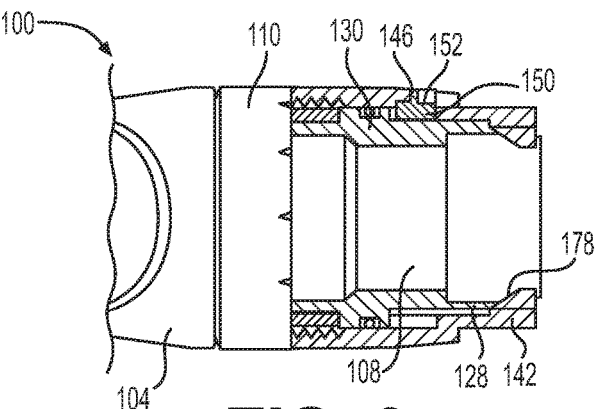
FIG. 6 is a partial cross-sectional view of the cable connector illustrated in FIG. 1.

Backshell 110 may be manually released by using a lifting tool, such as a flathead screw driver, that engages a portion of release element 152 that extends in and/or through the pass through opening 146 of backshell 110 and is accessible from outside of backshell 110, as seen in FIG. 6. In a preferred embodiment, release element 152 includes a slot 170 (FIG. 5) that is sized to receive the lifting tool such that locking member 112 may be lifted away from the connector thereby disengaging the inwardly extending tooth 150 from the teeth on locking portion 132 of inner sleeve 108 and allowing backshell 110 to be rotated in the loosening direction. Recessed area 148 on the outer surface of backshell 110 adjacent to the pass through opening 146 allows the lifting tool to rest thereon, thereby providing a lever action for the lifting tool to facilitate lifting of the locking member 112 via slot 170. Alternatively, backshell 110 may incorporate a toggle type release lever for the locking member 112 so that a special tool is not required to release the backshell 110. This toggle lever could be housed, for example, within an internal slot on the rearward facing wall of the backshell. A downward force applied to the toggle lever would lift the locking tooth 150 while applying a turning action to the backshell in the loosening direction would release locking member 112.

Figure 7:
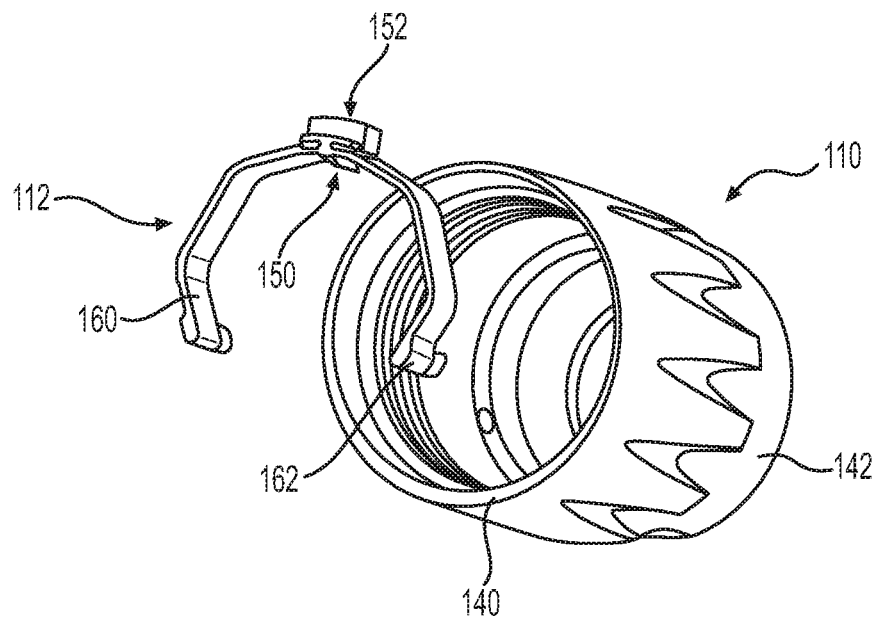
FIG. 7 is an exploded view of a backshell and locking member of the cable connector illustrated in FIG. 1.

Locking member 112 is preferably flexible to allow inwardly extending tooth 150 to move radially inwardly and outwardly with respect to outwardly extending teeth of the inner sleeve's locking portion 132 as the backshell 110 is rotated in the tightening direction. In a preferred embodiment, locking member 112 is a leaf spring with first and second spring arms 160 and 162, as seen in FIG. 7. Springs arms 160 and 162 may be coupled to backshell 110, via pivot pins or the like, to hold inwardly extending tooth 150 in its radial position. The pivot pins may be located on opposite sides of the inner surface circumference of backshell 110. The spring arms 160 and 162 preferably have a certain length to allow sufficient flexural movement of the tooth 150 during ratcheting and release, while still keeping the inner sleeve 108 at a low profile. As the tooth 150 follows the ratchet profile of the outwardly extending teeth of the inner sleeve's locking portion 132, spring arms 160 and 162 flex inwardly or outwardly pivoting and/or flexing about the pivot pins at preferably two points located within the backshell 110. The neutral position of the spring arms 160 and 162 is preferably in an outwardly and open position so that the inwardly extending the tooth 150 pulls inwards towards the correspondingly toothed inner sleeve locking portion 132 in order to be ready to lock on the most adjacent of the teeth of locking portion 132 of inner sleeve 108 should backshell 110 be turned in the loosening direction.

Leaf spring 112 may be formed of any resilient structurally sturdy injection moldable material (e.g. POM) for cost-effectiveness and strength performance. Alternatively, leaf spring 112 may by stamping it out of a metallic resilient material. Leaf spring 112 may be formed as one-piece or separate pieces integrally attached to one another.

Referring to FIG. 8, the connector 100 of the present invention also provides strain relief to the cable thereof. Cable termination section 128 of inner sleeve 108 includes the strain relief portion 134 in addition to the locking portion 132. In a preferred embodiment, strain relief portion 134 is at a distal end 174 on cable termination section 128 and generally adjacent to locking portion 132. Strain relieve portion 134 may comprise one or more collet fingers 176 that cooperate with a chamfered surface 178 (FIG. 6) at the rear of backshell 110 to clamp the cable as backshell 110 is rotated in the tightening direction, thereby providing strain relief to the cable. The number and size of collet clamp fingers 176 uniformly compress the grommet element fitted to the cable exterior to achieve good cable strain relief without damaging the cable jacket while also providing sealing along the cable jacket interface.

Although both the strain relief and locking systems of the present invention are preferably both provided at the back end of the connector 100, the strain relief and locking systems operate separately from one another. Thus, even if the strain relief of the present invention is not well activated, backshell 110 will still remain positively locked relative to housing 104 due to the locking system of the present invention. And the locking system will not be affected by the elasticity or stiffness of the jacket of the cable. As such, the connector 100 can accommodate cables with jackets of varying stiffness while still providing a positive lock for backshell 110, even if the cable jacket stiffness changes over time.

While particular embodiments have been chosen to illustrate the invention, it will be understood by those skilled in the art that various changes and modifications can be made therein without departing from the scope of the invention as defined in the appended claims. For example, the locking of the present invention could be applied to the front end, i.e. the mating end that interfaces with another connector, of the connector 100.

What is claimed is:
1. A cable connector, comprising:
  a housing having opposite first and second ends, the first end being configured to interface with a mating connector, the housing receiving a contact member therein;
  an inner sleeve having an insert section extending into the second end of the housing and a cable termination section for receiving a cable, and the cable termination section including a locking portion;

a backshell having a first end that couples to the second end of the housing and an opposite second end that surrounds the cable termination section of the inner sleeve; and at least one locking member positioned between the cable termination section of the inner sleeve and the second end of the backshell, the locking member having a locking element for cooperating with the locking portion of the inner sleeve, wherein the backshell is rotatable with respect to the housing in a tightening direction, and the locking element of the locking member engages the locking portion of the inner sleeve such that rotation of the backshell in a loosening direction opposite the tightening direction is prevented.

2. The cable connector according to claim 1, wherein the locking portion of the inner sleeve includes one or more outwardly extending teeth extending from the cable termination section of the inner sleeve.

3. The cable connector according to claim 2, wherein the locking element is at least one inwardly extending tooth configured for a ratchet engagement with the one or more outwardly extending teeth of the inner sleeve.

4. The cable connector according to claim 3, wherein the at least one inwardly extending tooth and the one or more outwardly extending teeth have cooperating tangential surfaces allowing rotation of the backshell in the tightening direction and cooperating radial surfaces preventing rotation of the backshell in the loosening direction.

5. The cable connector according to claim 1, wherein the locking member includes a release element that extends at least partially through the second end of the backshell such that at least part of the release element is accessible from outside of the backshell.

6. The cable connector according to claim 5, wherein the release element of the locking member extends through the backshell in a radial direction and the at least part of the release element is configured to engage a lifting tool to lift the locking member away from the backshell, thereby releasing the backshell.

7. The cable connector according to claim 6, wherein the release element includes a slot that is sized to receive the lifting tool.

8. The cable connector according to claim 5, wherein the locking member is a leaf spring, the locking element extends inwardly from an inner surface of the leaf spring, and the release element extends outwardly from an outer surface of the leaf spring.

9. The cable connector according to claim 8, wherein the leaf spring includes at least one arm coupled to the backshell.

10. The cable connector according to claim 1, the cable termination section of the inner sleeve includes a strain relief portion.

11. The cable connector according to claim 10, wherein the strain relief portion is at a distal end of the cable termination section of the inner sleeve.

12. The cable connector according to claim 10, wherein the strain relief portion is adjacent to the locking portion on the cable termination section.

13. The cable connector according to claim 11, wherein the strain relief portion is one or more collet fingers configured to cooperate with a chamfered surface of the backshell to provide strain relief to the cable.

14. A cable connector, comprising:

a housing having opposite first and second ends, the first end being configured to interface with a mating connector, and the housing receiving a contact member;

a backshell having opposite first and second ends, the first end thereof being configured to couple to the second end of the housing by rotating the backshell in a tightening direction;

an inner sleeve having an insert section and a cable termination section, the insert section extending into the second end of the housing and the cable termination section being configured to receive a cable;

means for locking the backshell onto the housing such that the backshell is prevented from rotating with respect to the housing in a loosening direction that is opposite the tightening direction; and means for providing strain relief to the cable received in the cable termination section of the inner sleeve, wherein the means for locking the backshell and the means for providing strain relief operate independently of one another, and wherein both the means for locking the backshell and the means for providing strain relief are located at the cable termination section of the inner sleeve.

15. The cable connector according to claim 14, further comprising
means for releasing the means for locking the backshell, thereby allowing the backshell to be rotated with respect to the housing in a loosening direction.

16. The cable connector according to claim 14, wherein the means for locking the inner sleeve includes a locking member disposed between the backshell and the inner sleeve wherein the locking member cooperates with a locking portion of the cable termination section of the inner sleeve.

17. The cable connector according to claim 16, wherein the locking member is a leaf spring that includes an inwardly extending locking element that engages the locking portion of the inner sleeve and an opposite outwardly extending release element that engages the backshell.

18. The cable connector according to claim 17, wherein the locking portion of the inner sleeve includes one or more outwardly extending teeth extending from the cable termination section of the inner sleeve and the locking element is at least one inwardly extending tooth, the one or more outwardly extending teeth and the at least one inwardly extending tooth form a one-way ratchet engagement allowing the backshell to rotate in the tightening direction and preventing the backshell from rotating in the loosening direction.

19. The cable connector according to claim 18, wherein the release element extends through the inner sleeve so as to be accessible from outside of the inner sleeve by a tool.

20. The cable connector according to claim 14, wherein the means for providing strain relief includes a plurality of collet fingers at a distal end of the cable termination section of the inner sleeve that cooperate with a chamfered surface of the backshell for crimping onto the cable.

* * * * *